United States Patent
Pamplin

(10) Patent No.: US 10,702,837 B1
(45) Date of Patent: Jul. 7, 2020

(54) RECHARGEABLE BLENDER WITH OFFSET BLADES

(71) Applicant: BlendJet Inc., Concord, CA (US)

(72) Inventor: Ryan Michael Pamplin, Oakland, CA (US)

(73) Assignee: BlendJet, Inc., Concord, CA (US)

( * ) Notice: Subject to any disclaimer, the term of this patent is extended or adjusted under 35 U.S.C. 154(b) by 0 days.

(21) Appl. No.: 16/666,035

(22) Filed: Oct. 28, 2019

(51) Int. Cl.
*A47J 43/046* (2006.01)
*B01F 13/00* (2006.01)
*A47J 43/08* (2006.01)
*H02J 7/00* (2006.01)

(52) U.S. Cl.
CPC .......... *B01F 13/002* (2013.01); *A47J 43/046* (2013.01); *A47J 43/085* (2013.01); *H02J 7/00* (2013.01); *H02J 2007/0062* (2013.01)

(58) Field of Classification Search
CPC .................................................... A47J 43/046
USPC ........................................ 366/130, 205, 314
See application file for complete search history.

(56) References Cited

U.S. PATENT DOCUMENTS

| | | |
|---|---|---|
| 3,931,494 A | 1/1976 | Fisher |
| 4,095,090 A | 6/1978 | Pianezza |
| 4,435,084 A | 3/1984 | Calhoun |
| 4,487,509 A | 12/1984 | Boyce |
| 4,629,131 A | 12/1986 | Podell |
| 4,741,482 A | 5/1988 | Coggiola |
| 5,323,973 A * | 6/1994 | Ferrara, Jr. ........... A47J 43/046 241/100 |
| 5,425,579 A | 6/1995 | Sampson |
| 5,639,161 A | 6/1997 | Sirianni |
| 5,720,552 A * | 2/1998 | Schindlegger ..... A47G 19/2205 366/197 |
| 6,568,843 B1 | 5/2003 | Lai |
| 6,614,206 B1 | 9/2003 | Wong |
| 7,314,307 B2 | 1/2008 | Cai |
| 7,364,348 B1 | 4/2008 | Jones |
| 7,384,182 B2 | 6/2008 | Bhavnani |
| 7,422,362 B2 | 9/2008 | Sands |
| 7,518,343 B2 | 4/2009 | Veselic |
| 8,851,739 B2 * | 10/2014 | Gonzalez .............. A47J 43/046 366/130 |
| 9,035,222 B2 | 5/2015 | Alexander |
| 9,039,274 B1 | 5/2015 | Corda |
| 9,549,639 B2 | 1/2017 | Garr |
| 9,787,130 B2 | 10/2017 | Kim |
| 9,814,331 B2 | 11/2017 | Alexander |
| 10,010,213 B2 | 7/2018 | Alexander |
| 10,143,980 B1 | 12/2018 | Marko |
| 10,188,229 B2 | 1/2019 | Alexander |

(Continued)

FOREIGN PATENT DOCUMENTS

| | | |
|---|---|---|
| CN | 204520400 | 8/2015 |
| GB | 2506926 | 4/2014 |
| WO | 2017157965 | 9/2017 |

OTHER PUBLICATIONS

PCT International Search Report and Written Opinion, Application No. PCT/US19/63089, dated Feb. 19, 2020, dated 11 pages.

*Primary Examiner* — David L Sorkin
(74) *Attorney, Agent, or Firm* — Esplin & Associates, PC

(57) ABSTRACT

A rechargeable blender with offset blades is disclosed. Exemplary implementations may include a base assembly, a container assembly, control circuitry, and/or other components. The blender includes a set of blades that is offset from the center.

18 Claims, 15 Drawing Sheets

(56) References Cited

U.S. PATENT DOCUMENTS

| | | | |
|---|---|---|---|
| 10,383,482 | B1 | 8/2019 | Pamplin |
| 10,427,119 | B1* | 10/2019 | Bertsch ................. A47J 43/042 |
| 2001/0036124 | A1 | 11/2001 | Rubenstein |
| 2006/0126431 | A1* | 6/2006 | Bhavnani .............. A47J 43/046 |
| | | | 366/314 |
| 2007/0182367 | A1 | 8/2007 | Partovi |
| 2007/0209528 | A1 | 9/2007 | Chang |
| 2007/0290555 | A1 | 12/2007 | Caren |
| 2008/0259722 | A1 | 10/2008 | Sanford |
| 2008/0265838 | A1 | 10/2008 | Garg |
| 2010/0005977 | A1 | 1/2010 | Menashes |
| 2010/0301808 | A1 | 12/2010 | David |
| 2011/0248108 | A1 | 10/2011 | Carriere |
| 2012/0167781 | A1* | 7/2012 | Lane ....................... A47J 27/56 |
| | | | 99/453 |
| 2013/0222991 | A1 | 8/2013 | McWilliams |
| 2014/0247686 | A1 | 9/2014 | Arnett |
| 2014/0301155 | A1 | 10/2014 | Montgomery |
| 2015/0117137 | A1 | 4/2015 | Haney |
| 2015/0165402 | A1* | 6/2015 | King ................. B01F 15/00409 |
| | | | 366/145 |
| 2015/0374175 | A1 | 12/2015 | Garr |
| 2016/0235243 | A1 | 8/2016 | Grassia |
| 2017/0104297 | A1 | 4/2017 | Scott |
| 2017/0110898 | A1 | 4/2017 | Kyriakoulis |
| 2018/0146826 | A1 | 5/2018 | Mizrahi |
| 2018/0160855 | A1 | 6/2018 | Krivos |
| 2018/0221836 | A1 | 8/2018 | Ni |
| 2019/0082893 | A1* | 3/2019 | Faulkner-Edwards ...................... |
| | | | A47J 43/0722 |

\* cited by examiner

RECHARGEABLE BLENDER WITH OFFSET BLADES

FIELD OF THE DISCLOSURE

The present disclosure relates to a rechargeable blender with a set of blades that is offset from the center.

BACKGROUND

Blenders are known, typically as consumer-grade home appliances. Rechargeable batteries are known.

SUMMARY

One aspect of the present disclosure relates to a rechargeable blender with offset blades configured to blend foodstuffs. In some implementations, the rechargeable blender may be portable due to its size, and/or its rechargeability. By virtue of true portability, a user can take the blender anywhere and create drinks, shakes, smoothies, baby food, sauces, and/or other concoctions. Once the blender is fully charged, a user can prepare multiple servings quickly and easily. Lack of an external power source, much less a reliable external power source, is no longer preventing users from enjoying blended drinks. By virtue of the blades being offset from the center, foodstuffs are blended more efficiently. For example, ice is crushed more finely using fewer rotations of the blades.

The blender with offset blades may include a base assembly, a container assembly, control circuitry, and/or other components. As used herein, the term "foodstuffs" may include ingredients ranging from solid to liquid, from hot to cold or frozen, in any combination. As used herein, the term "ingredient" merely connotes something fit to ingest, and not necessarily nutritional value. For example, ice and/or ice cubes may be ingredients.

As used herein, any association (or relation, or reflection, or indication, or correspondency) involving assemblies, blades, motors, rotational axes, longitudinal axes, diameters, batteries, couplings, interfaces, buttons, detectors, indicators, magnetic elements, caps, rotations, and/or another entity or object that interacts with any part of the blender and/or plays a part in the operation of the blender, may be a one-to-one association, a one-to-many association, a many-to-one association, and/or a many-to-many association or N-to-M association (note that N and M may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
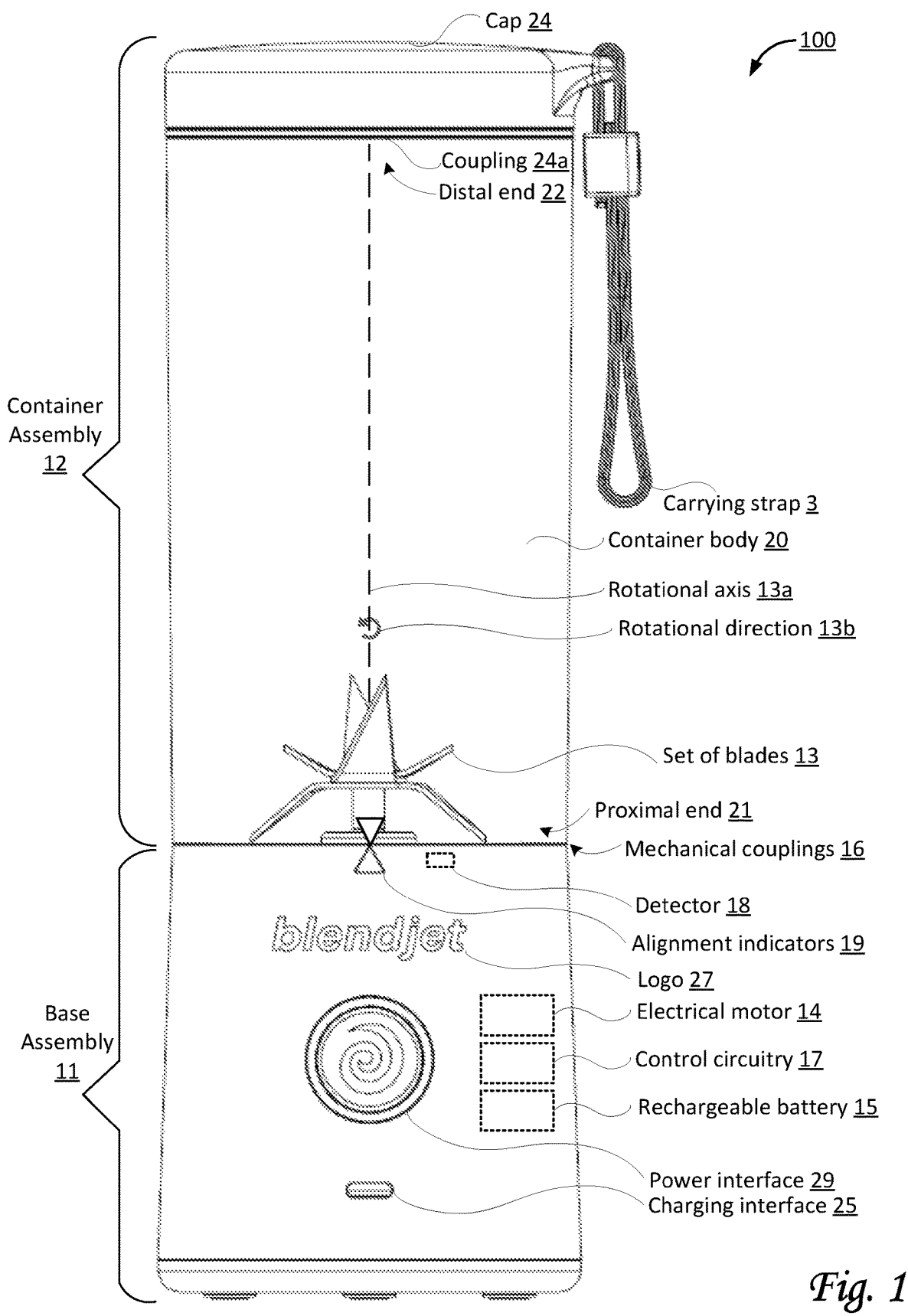
FIG. 1 shows a front view of a rechargeable blender with offset blades configured to blend foodstuffs, in accordance with one or more implementations.

FIG. 1 shows a rechargeable blender 100 with offset blades (hereinafter blender 100) configured to blend foodstuffs, in accordance with one or more implementations. Blender 100 may include one or more of a base assembly 11, a container assembly 12, control circuitry 17 (depicted in FIG. 1 as a dotted rectangle to indicate this component may be embedded within base assembly 11, and not readily visible from the outside), and/or other components. Base assembly 11 and container assembly 12 may be configured to be coupled during blending by blender 100. For example, in some implementations, base assembly 11 and container assembly 12 may be mechanically coupled, e.g., through one or more threaded couplings. Other types of couplings may be envisioned for blender 100, though leak-proof options may be preferred, since most uses include one or more liquid ingredients. In some implementations, control circuitry 17 and/or other components may be included in base assembly 11, e.g., within base assembly 11. For example, one or more of control circuitry 17, electrical motor 14, rechargeable battery 15, and/or other components may be integrated permanently into base assembly 11 such that base assembly 11 forms an integral whole.

Base assembly 11 may include one or more of a base body 11b (FIG. 6), a set of blades 13 (also referred to as a set of one or more blades 13), an electrical motor 14 (depicted in FIG. 1 as a dotted rectangle to indicate this component may be embedded within base assembly 11), a rechargeable battery 15 (depicted in FIG. 1 as a dotted rectangle to indicate this component is embedded within base assembly 11), a standardized charging interface 25, one or more mechanical couplings 16, a detector 18, one or more alignment indicators 19, a power interface 29, a logo 27 (which may visually refer to a corporate identity), and/or other components.

Proximal end 21 of container assembly 12 may be disposed near set of blades 13 during blending of blender 100. Distal end 22 of container assembly 12 may be disposed opposite proximal end 21.

Figure 2:
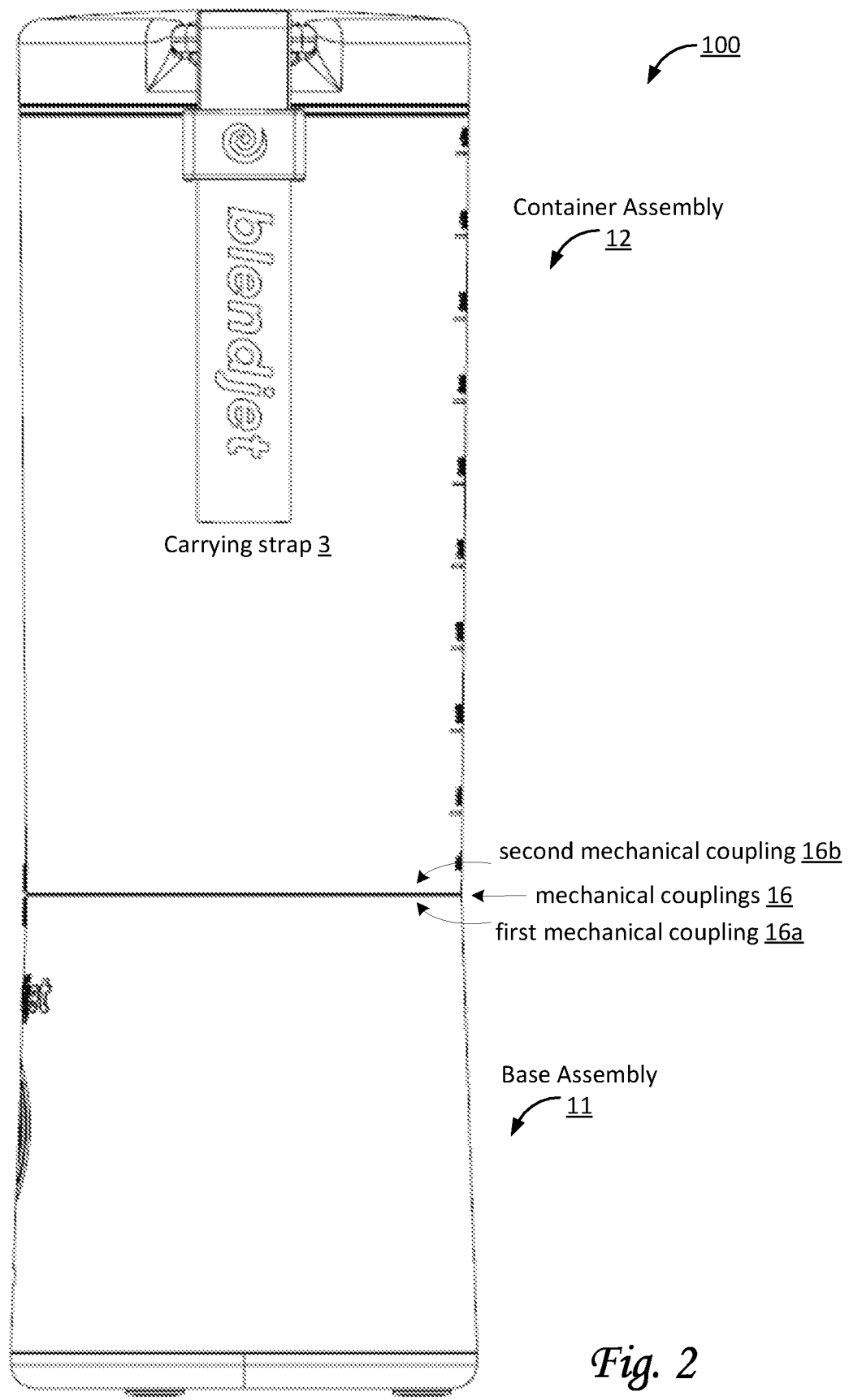
FIG. 2 shows a side view of a rechargeable blender with offset blades configured to blend foodstuffs, in accordance with one or more implementations.

In some implementations, one or more mechanical couplings 16 may include threaded couplings. By way of non-limiting example, FIG. 2 shows a side view of blender 100 with offset blades configured to blend foodstuffs. For example, one or more mechanical couplings 16 may include a first mechanical coupling 16a and a second mechanical coupling 16b. In some implementations, first mechanical coupling 16a included in base assemble 11 may be a female threaded coupling configured to fit together with second mechanical coupling 16b of container assembly 12. First mechanical coupling 16a and second mechanical coupling 16b may be configured to (temporarily and detachably) couple base assembly 11 to container assemble 12.

Second mechanical coupling 16b of container assembly 12 may be disposed at or near proximal end 21 of container assembly 12. Second mechanical coupling 16b may be configured to engage first mechanical coupling 16a to couple base assembly 11 to container assembly 12. In some implementations, first mechanical coupling 16a and second mechanical coupling 16b may be threaded couplings. In some implementations, first mechanical coupling 16a and second mechanical coupling 16b may have parallel threads.

Figure 3:
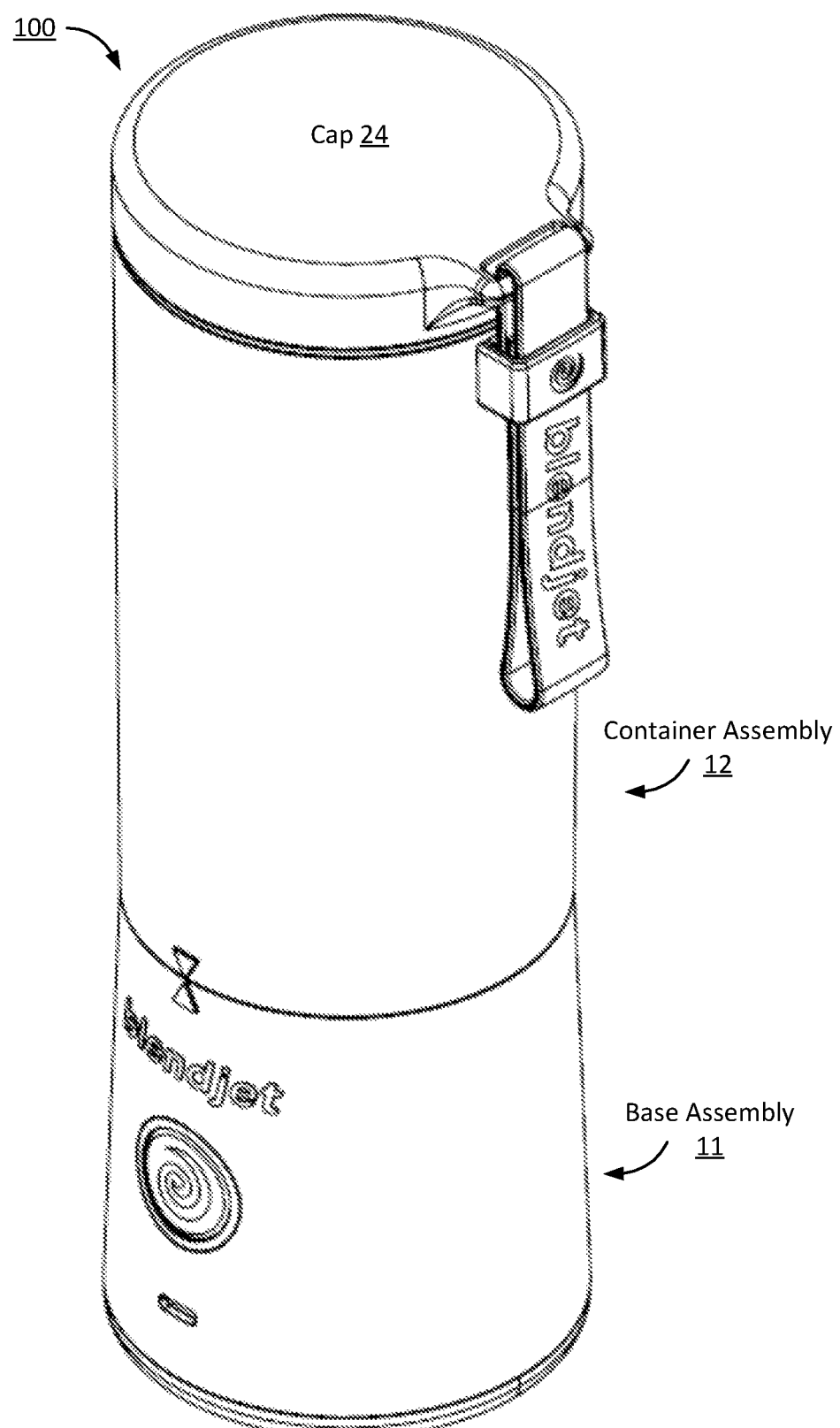
FIG. 3 shows an isometric elevated view of a rechargeable blender with offset blades configured to blend foodstuffs, in accordance with one or more implementations.
Figure 4A:
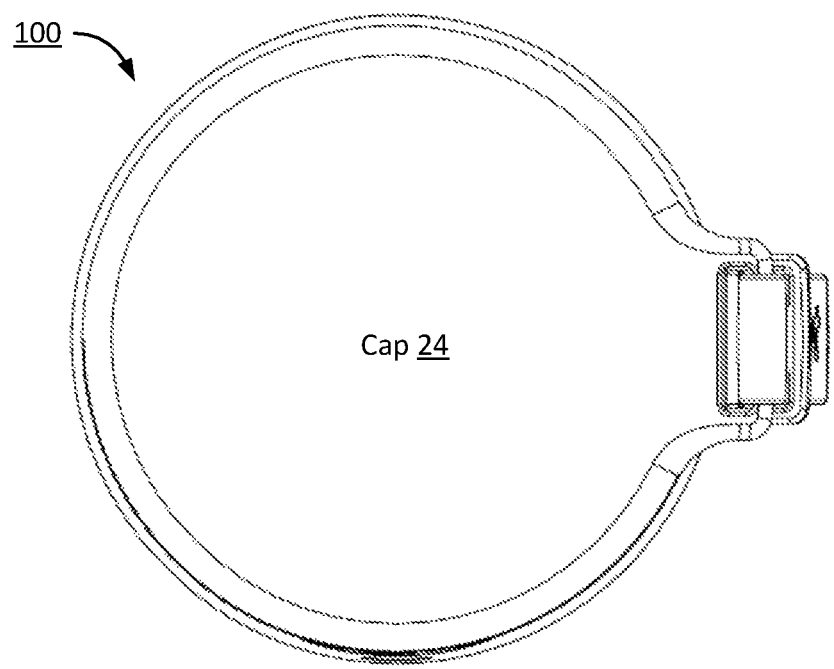
FIG. 4A shows a top view of a rechargeable blender with offset blades configured to blend foodstuffs, in accordance with one or more implementations.
Figure 4B:
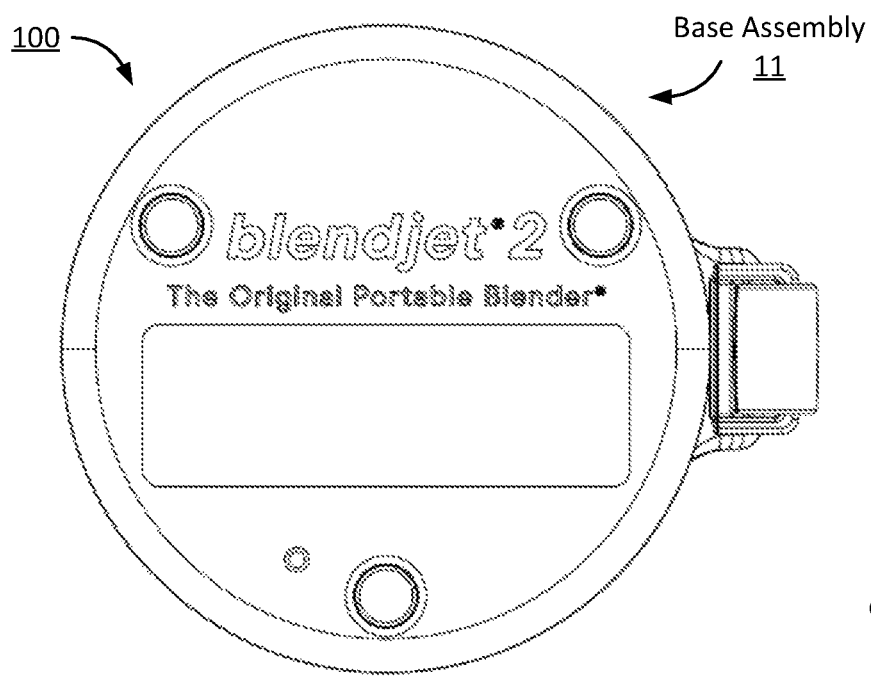
FIG. 4B shows a bottom view of a rechargeable blender with offset blades configured to blend foodstuffs, in accordance with one or more implementations.

By way of non-limiting example, FIG. 3 shows an isometric elevated view of blender 100 depicting its cylindrical shape. By way of non-limiting example, FIG. 4A shows a top view of blender 100 depicting cap 24. By way of non-limiting example, FIG. 4B shows a bottom view of blender 100 depicting the bottom of base assembly 11.

Referring to FIG. 1, set of blades 13 may be rotatably mounted to base assembly 11 to blend foodstuffs. Set of blades 13 may be configured to rotate around a rotational axis 13a. Rotational axis 13a is depicted in FIG. 1 as a geometric 2-dimensional line extending indefinitely through set of blades 13, and is not a physical axis. Rather, rotational axis 13a indicates how set of blades 13 rotates in relation to other components of blender 100, in a rotational direction 13b. In some implementations, set of blades 13 may be mounted permanently to base assembly 11. In some implementations, set of blades 13 may be disposed at or near proximal end 21 of container assembly 12 during blending by blender 100. In some implementations, set of blades 13 may include 1, 2, 3, 4, 5, or more pairs of blades. In some implementations, a pair of blades may include two blades on opposite sides of rotational axis 13a. In some implementations, a pair of blades may have two blades such that the distal ends of these two blades are at the same horizontal level. In some implementations, as depicted in the upright configuration of blender 100 in FIG. 1, set of blades 13 may include six blades that form 3 pairs of blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations having limited power (when compared to common outlets), such as disclosed herein. As used herein, directional terms such as upward, downward, left, right, front, back, and so forth are relative to FIG. 1 unless otherwise noted.

Figure 5:
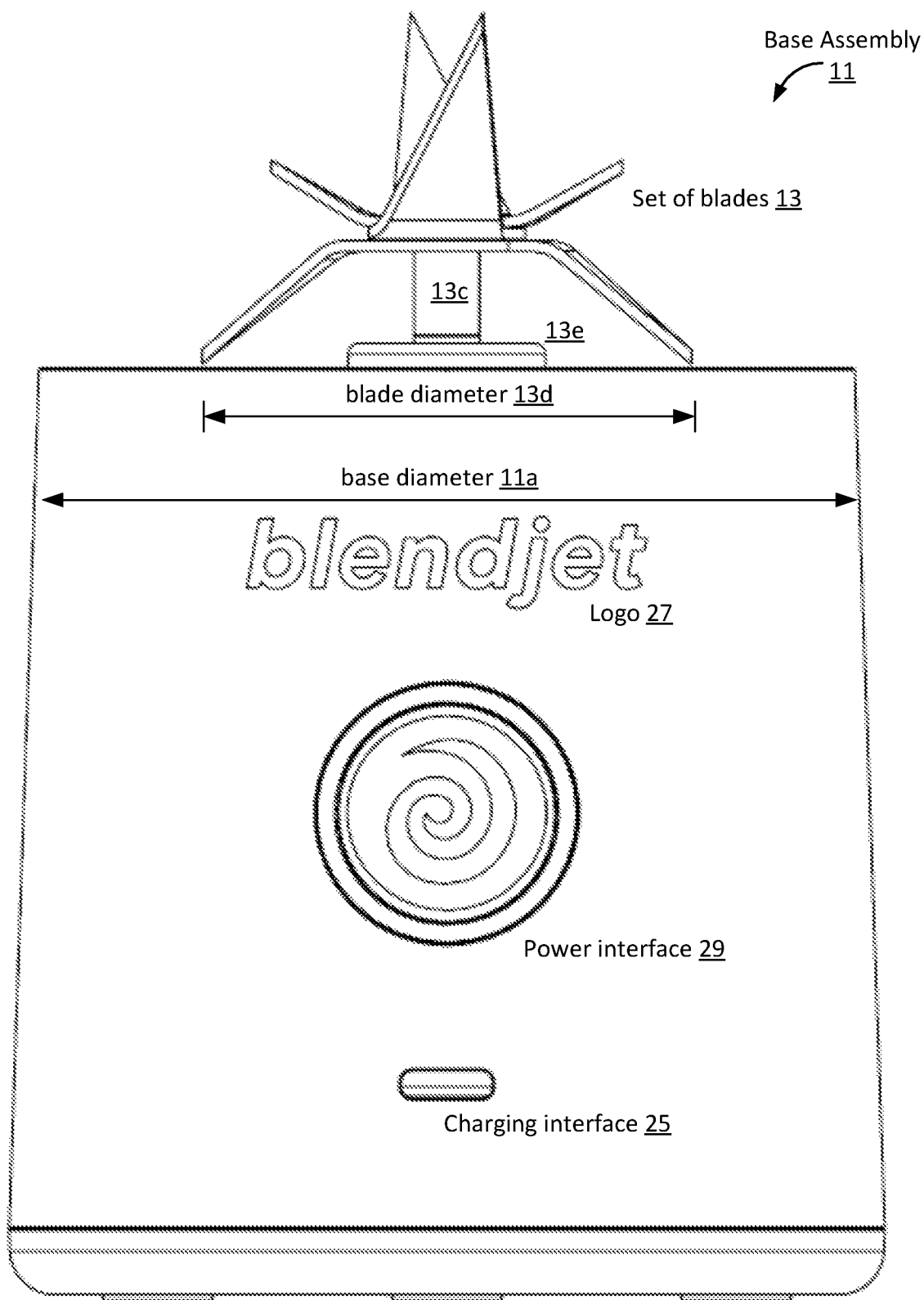
FIG. 5 shows a front view of a base assembly of a rechargeable blender with offset blades configured to blend foodstuffs, in accordance with one or more implementations.
Figure 7:
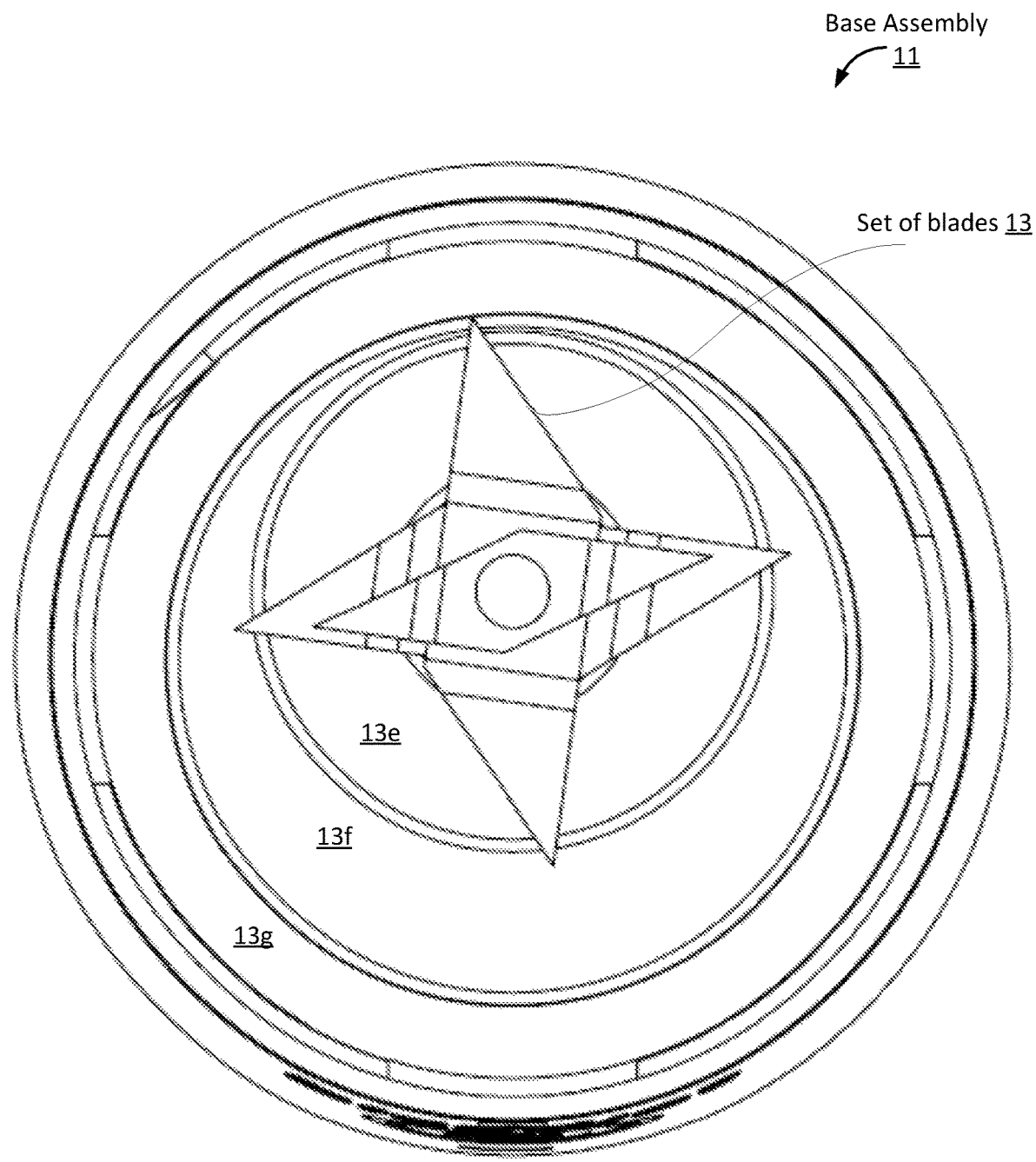
FIG. 7 shows a top view of a base assembly of a rechargeable blender with offset blades configured to blend foodstuffs, in accordance with one or more implementations.
Figure 8:
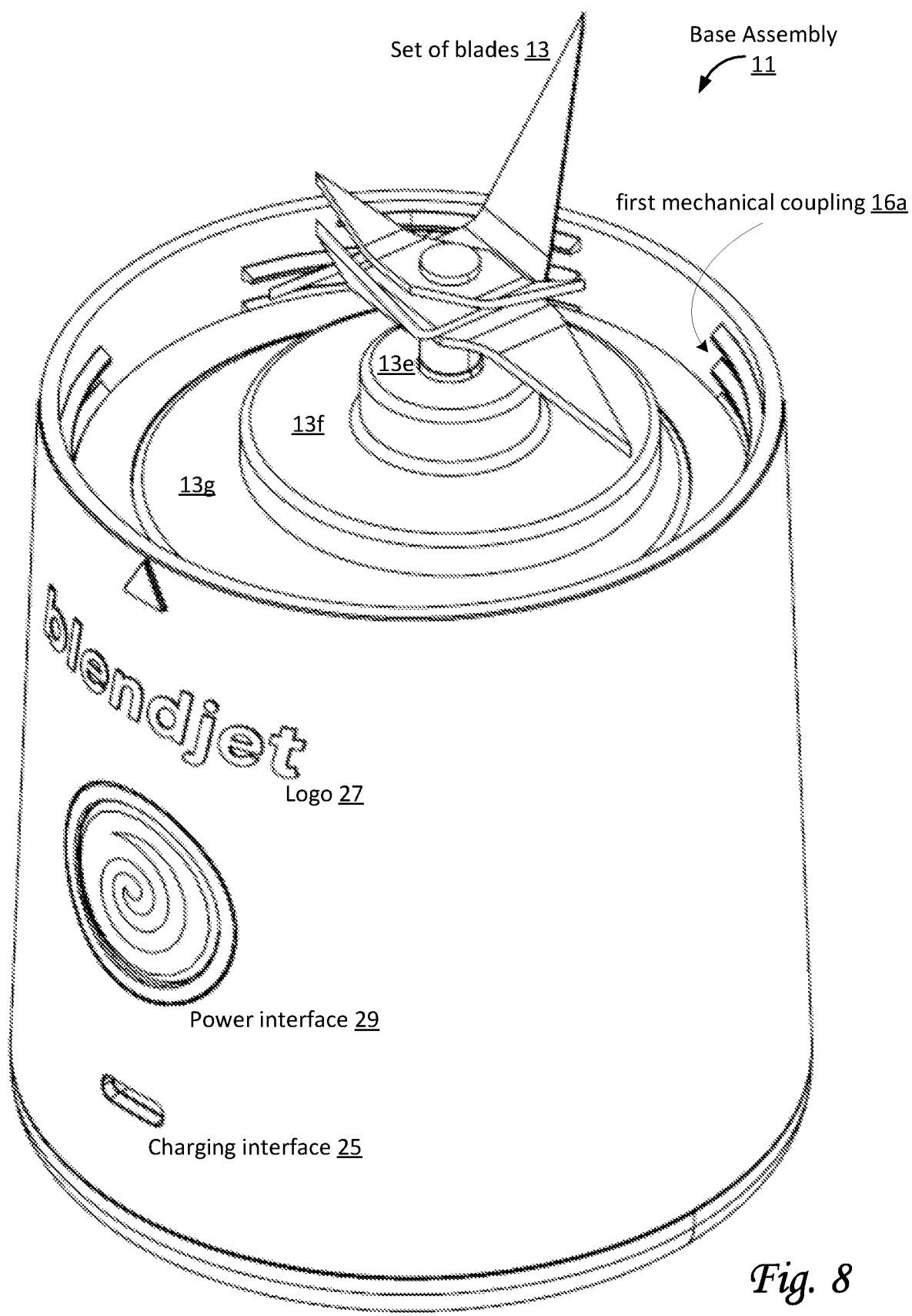
FIG. 8 shows an isometric elevated view of a base assembly of a rechargeable blender with offset blades configured to blend foodstuffs, in accordance with one or more implementations.

Referring to FIG. 1, in some implementations, base assembly 11 may have a cylindrical shape (apart from set of blades 13). By way of non-limiting example, FIGS. 5-6-7-8 shows different views of base assembly 11 of blender 100 that depict base assembly 11 as having a cylindrical shape. For example, horizontal cross-sections of base assembly 11 may have a circular shape. In some implementations, the cylindrical shape of base assembly 11 may have a diameter between 2 and 4 inches, which may be referred to as a base diameter. In some implementations, the cylindrical shape of base assembly 11 may have a base diameter between 3 and 3.5 inches. Such a base diameter may improve portability, as well as allow blender 100 to be stored in a cup holder, e.g., in a vehicle. For example, FIG. 5 shows a front view of base assembly 11, depicting a blade diameter 13d (e.g., the diameter of the circle described by rotation of the distal ends of the lowest pair of blades in set of blades 13) and a base diameter 11a (as measured at or near the top of base assembly 11). In some implementations, blade diameter 13d may refer to the largest diameter of any circle described by rotation of distal ends of pairs of blades in set of blades 13, as measured perpendicular to rotation of set of blades 13. In some implementations, the orientation of blade diameter 13d may be orthogonal to the direction of rotational axis 13a. In some implementations, the plane of rotation of the distal ends of the blades that define blade diameter 13d may be orthogonal to the direction of rotational axis 13a. In some implementations, blade diameter 13d may be at least 50% of base diameter 11a. In some implementations, blade diameter 13*d* may be about 60% of base diameter 11*a*. In some implementations, blade diameter 13*d* may range between 50% and 70% of base diameter 11*a*. In some implementations, blade diameter 13*d* may range between 60% and 70% of base diameter 11*a*. In some implementations, blade diameter 13*d* may range between 60% and 80% of base diameter 11*a*. FIG. 5 shows set of blades 13 may be supported by a shaft 13*c* mounted on an upper blade mount 13*e*. FIGS. 7 and 8 show a lower blade mount 13*f* arranged below upper blade mount 13*e*. Below lower blade mount 13*f* is a surface 13*g*. In some implementations, surface 13*g* may form the lowest point for foodstuffs during blending. By virtue of the stepwise structure formed by upper blade mount 13*e*, lower blade mount 13*f*, and surface 13*g*, foodstuffs may be blended more efficiently. For example, ice may be crushed more finely using fewer rotations of the blades. In some implementations, the horizontal plane that coincides with the top surface of upper blade mount 13*e* may be orthogonal to rotational axis 13*a*. Alternatively, and/or simultaneously, in some implementations, the horizontal plane that coincides with the top surface of lower blade mount 13*f* may be orthogonal to rotational axis 13*a*. Alternatively, and/or simultaneously, in some implementations, the horizontal plane that coincides with surface 13*g* may be orthogonal to rotational axis 13*a*. In some implementations, the plane of rotation of the distal ends of the blades that define blade diameter 13*d* may be parallel to one or more of the top surface of upper blade mount 13*e*, the top surface of lower blade mount 13*f*, and/or surface 13*g*.

In some implementations, set of blades 13 may be mounted permanently on base assembly 11 such that base assembly 11 forms an integral whole. In some implementations, base assembly 11 may have a conical shape, wherein the bottom of the conical shape may have a diameter between 2 and 4 inches, and wherein the top of the conical shape may have a diameter between 2 and 4 inches. For example, the bottom of base assembly 11 may be wider than the top of base assembly 11, as depicted in FIG. 5.

Figure 11:
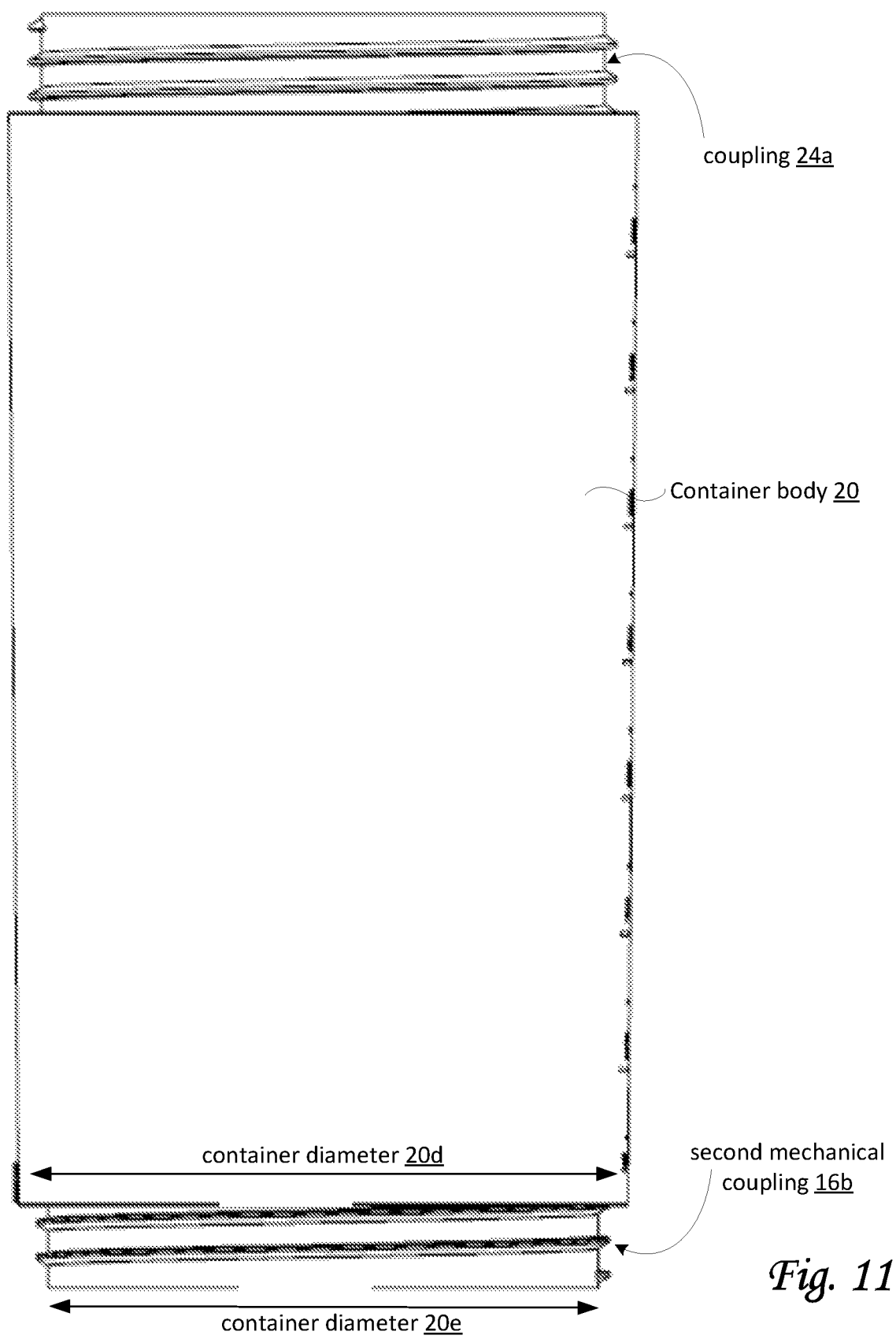
FIG. 11 shows a side view of a container body of a rechargeable blender with offset blades configured to blend foodstuffs, in accordance with one or more implementations.
Figure 12:
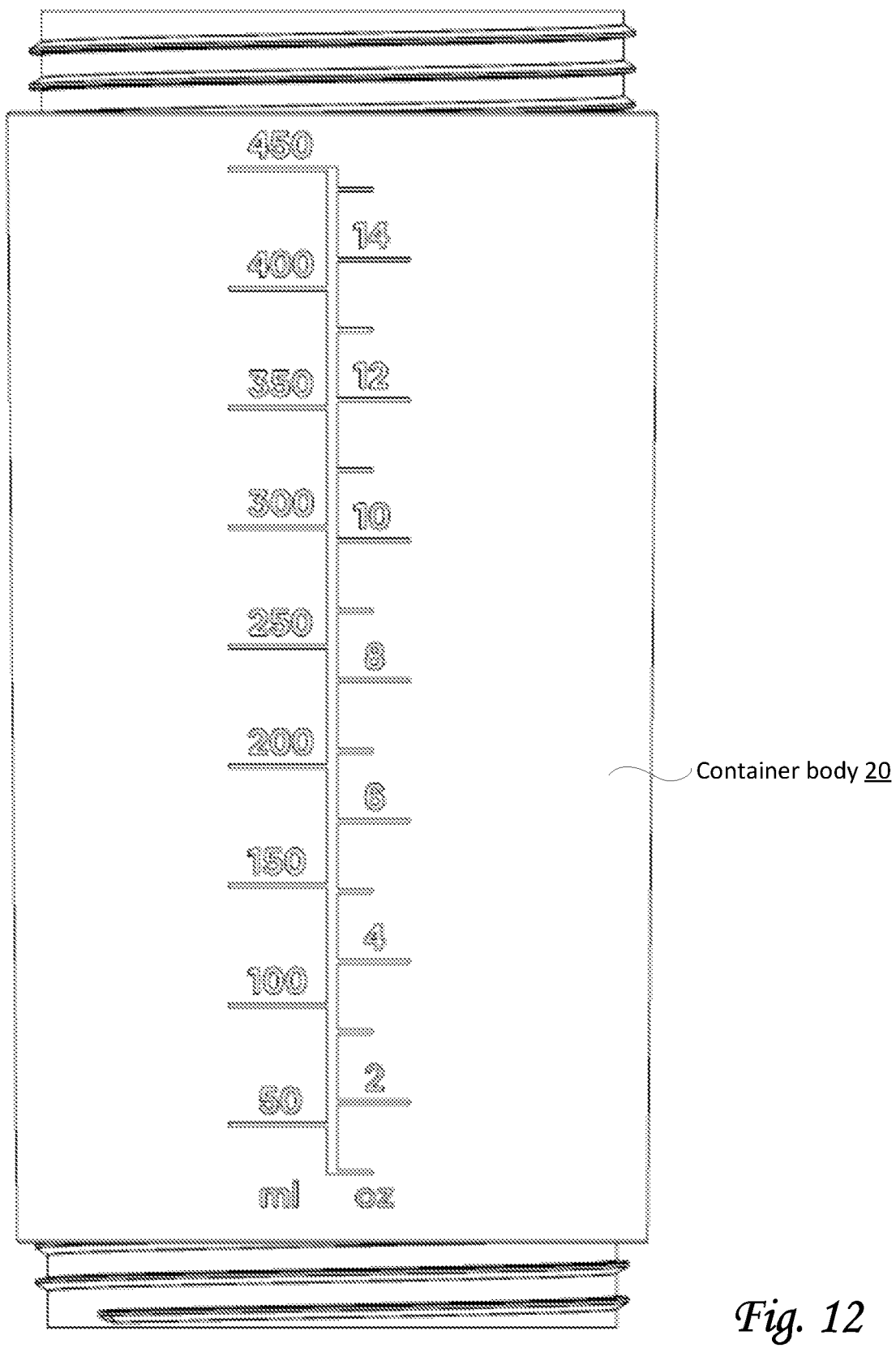
FIG. 12 shows a rear view of a container body of a rechargeable blender with offset blades configured to blend foodstuffs, in accordance with one or more implementations.
Figure 13:
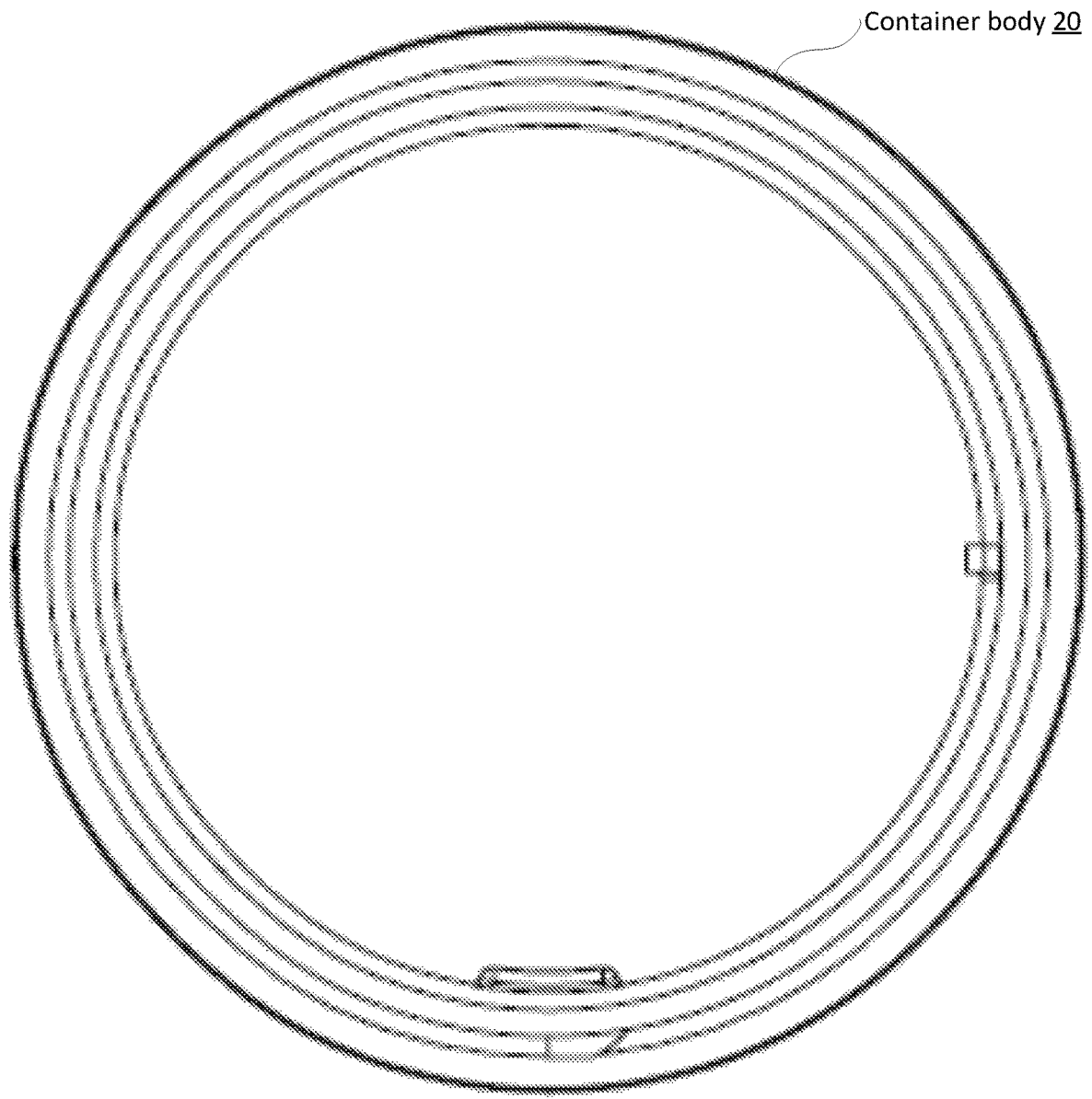
FIG. 13 shows a top view of a container body of a rechargeable blender with offset blades configured to blend foodstuffs, in accordance with one or more implementations.
Figure 14:
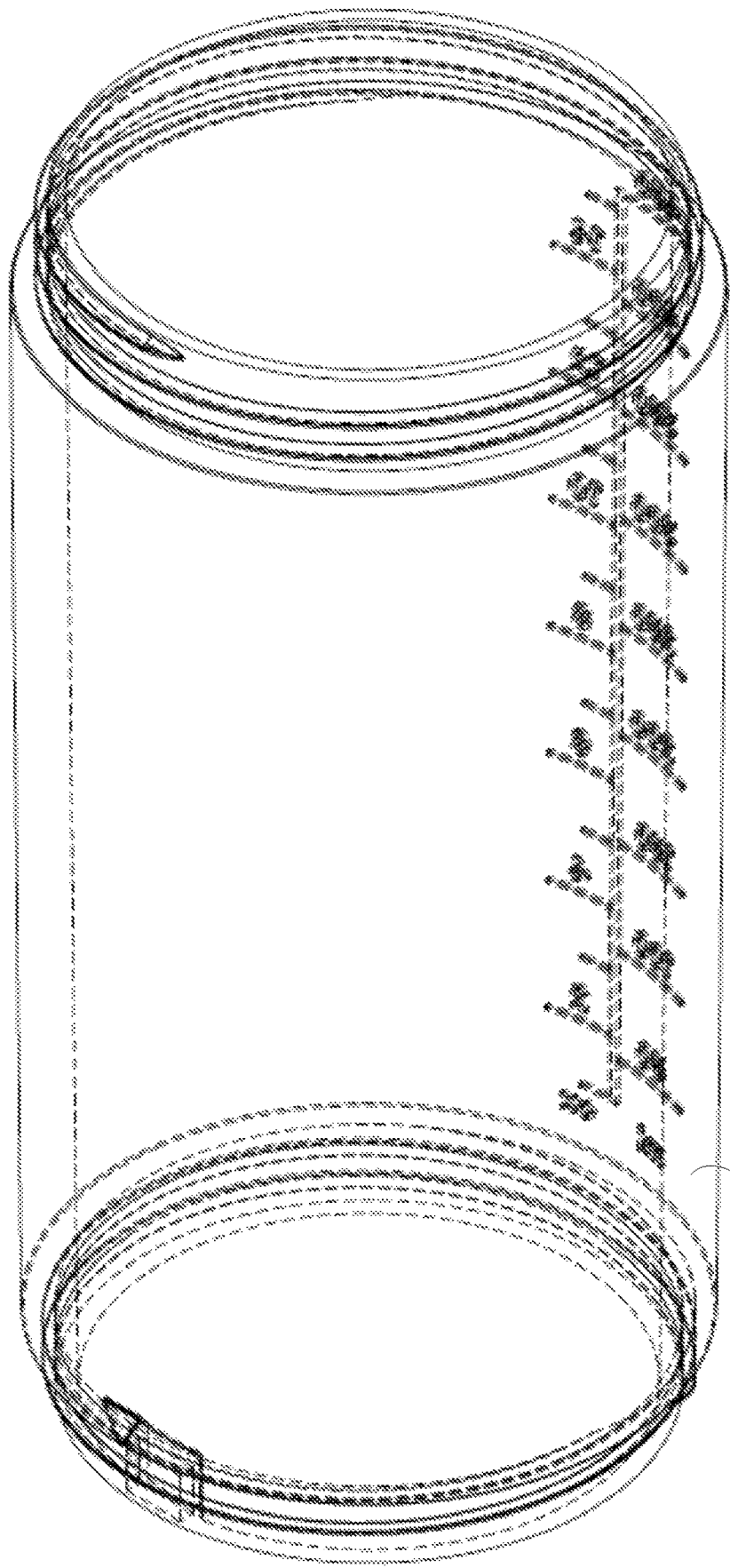
FIG. 14 shows an isometric elevated view of a container body of a rechargeable blender with offset blades configured to blend foodstuffs, in accordance with one or more implementations.

Referring to FIG. 1, container assembly 12 may include one or more of a proximal end 21, a distal end 22, a container body 20, a second mechanical coupling 26, a cap 24, a coupling 24*a*, a carrying strap 3, and/or other components. Container body 20 may form a vessel to hold and/or contain foodstuffs within container assembly 12. In some implementations, container body 20 may be a cylindrical body and/or have a cylindrical shape, as depicted in different views in FIGS. 10-14. In some implementations, the dimensions of container assembly 12 may be such that the internal volume of container assembly 12 can hold 8, 10, 12, 14, 16, 18, 20, 22, 24, 28, 32, 36, 48, or more ounces. In some implementations, container assembly 12 and/or container body 20 may have cylindrical shapes. As shown in FIG. 11, in some implementations, the cylindrical shapes of container assembly 12 and/or container body 20 may have a container diameter 20*d* between 2 and 4 inches (as measured at or near the bottom of container body 20). In some implementations, container body 20 may have a container diameter 20*e* at or near second mechanical coupling 16*b*. In some implementations, container diameter 20*d* and/or container diameter 20*e* may be between 3 and 3.5 inches. In some implementations, container body 20 may be transparent. Referring to FIG. 11, in some implementations, second mechanical coupling 16*b* may be a male threaded coupling configured to fit together with first mechanical coupling 16*a* of base assembly 11 (in FIG. 8). In some implementations, coupling 24*a* may be a threaded coupling configured to fit together with cap 24. In some implementations, blade diameter 13*d* (see FIG. 5) may be at least 50% of container diameter 20*d* (FIG. 11). In some implementations, blade diameter 13*d* may be about 60% of container diameter 20*d*. In some implementations, blade diameter 13*d* may range between 50% and 70% of container diameter 20*d*. In some implementations, blade diameter 13*d* may range between 60% and 70% of container diameter 20*d*. In some implementations, blade diameter 13*d* may range between 60% and 80% of container diameter 20*d*. Alternatively, and/or simultaneously, in some implementations, blade diameter 13*d* (see FIG. 5) may be at least 50% of container diameter 20*e* (FIG. 11). In some implementations, blade diameter 13*d* may be about 60% of container diameter 20*e*. In some implementations, blade diameter 13*d* may range between 50% and 70% of container diameter 20*e*. In some implementations, blade diameter 13*d* may range between 60% and 70% of container diameter 20*e*. In some implementations, blade diameter 13*d* may range between 60% and 80% of container diameter 20*e*.

Referring to FIG. 1, electrical motor 14 may be configured to rotationally drive set of blades 13. In some implementations, electrical motor 14 may operate at a voltage between 5V and 10V. In one or more preferential implementations, electrical motor 14 may operate at a voltage of about 7.4V. In some implementations, electrical motor 14 may be configured to spin set of blades 13 at a maximum speed between 20,000 rotations per minute (RPM) and 35,000 RPM. In one or more preferential implementations, electrical motor 14 may spin set of blades 13 at a maximum speed of about 22,000 RPM. Electrical motor may be configured to be powered by rechargeable battery 15. Simultaneously, in some implementations, electrical motor 14 may be further configured to be powered through standardized charging interface 25, though that may not be the preferred way of operating blender 100. In one or more preferential implementations, no power is (or need be) supplied to electrical motor 14 from an external power source during blending by blender 100. In some implementations, control circuit 17 may be configured to control electrical motor 14 during rotation of set of blades 13. For example, control circuit 17 may control the speed of the rotation of set of blades 13 during blending by blender 100.

Figures 9, 9A:
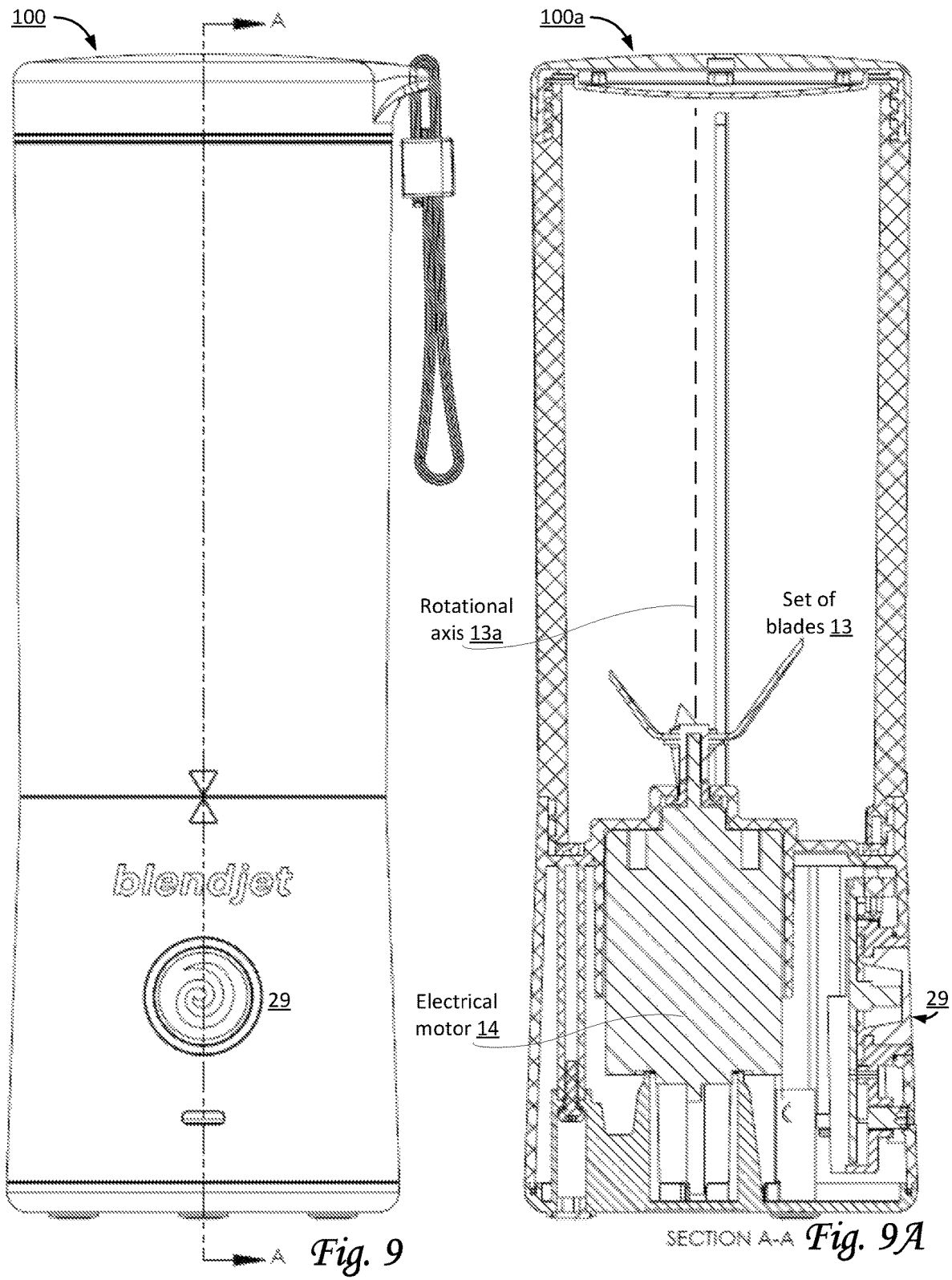
FIG. 9 shows a front view of a rechargeable blender with offset blades configured to blend foodstuffs, with an indication for a cross-sectional view, in accordance with one or more implementations.
FIG. 9A shows a cross-sectional view of a rechargeable blender with offset blades configured to blend foodstuffs, as indicated in FIG. 9, in accordance with one or more implementations.
Figure 10:
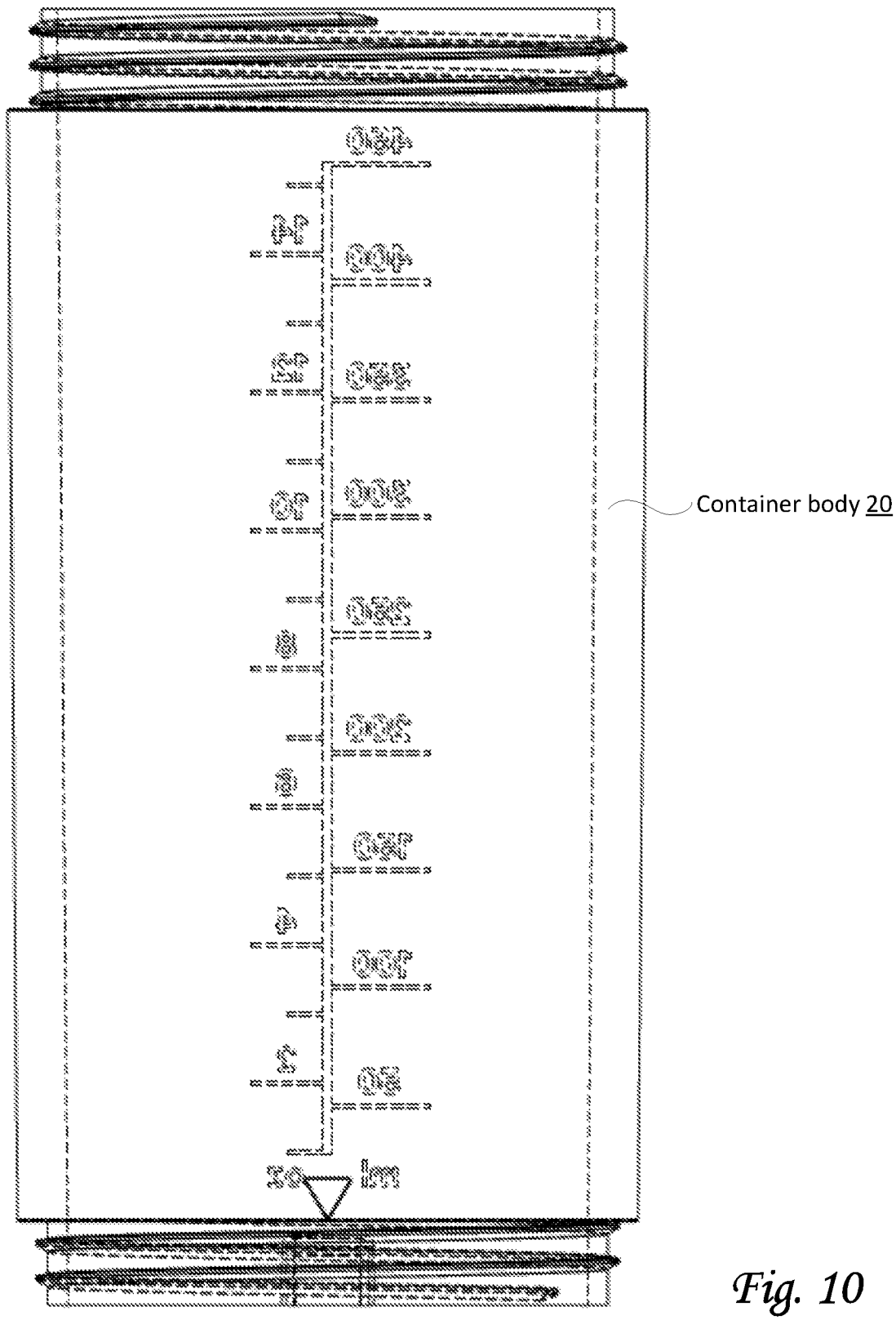
FIG. 10 shows a front view of a container body of a rechargeable blender with offset blades configured to blend foodstuffs, in accordance with one or more implementations.

By way of non-limiting example, FIG. 9 shows a front view of blender 100 with an indication for a cross-sectional view labeled "A-A", and FIG. 9A shows a cross-sectional view 100*a* of blender 100 labeled "SECTION A-A" as indicated in FIG. 9. FIG. 9A shows the position and arrangement of electrical motor 14 in relation to set of blades 13 and rotational axis 13*a*. As depicted, electrical motor 14 and set of blades 13 are offset from being centered within blender 100. The front of blender 100 is depicted on the right-hand side in FIG. 9A, illustrating that electrical motor 14 and set of blades 13 are offset towards the back of blender 100.

Figure 6:
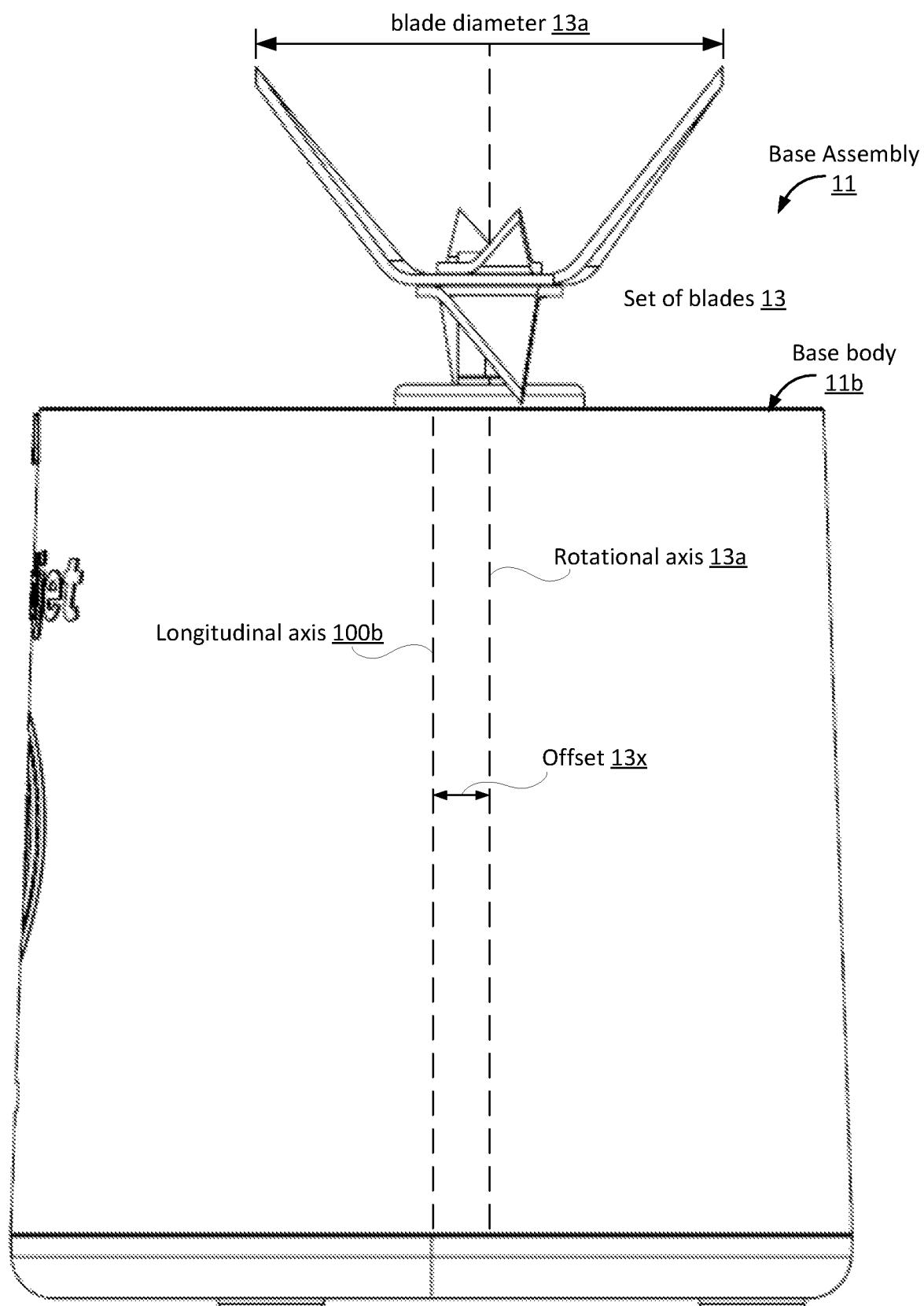
FIG. 6 shows a side view of a base assembly of a rechargeable blender with offset blades configured to blend foodstuffs, in accordance with one or more implementations.

By way of non-limiting example, FIG. 6 shows a side view of base assembly 11 of blender 100 in a manner that depicts the position and arrangement of set of blades 13 and rotational axis 13*a* in relation to the rest of base assembly 11. In particular, the cylindrical shape of base body 11*b* may have a longitudinal axis 100*b*, which is a geometric 2-dimensional line extending indefinitely through base assembly 11 (and/or blender 100). Longitudinal axis 100*b* is not a physical axis. Instead, the shape of base assembly 11 (particularly base body 11*b*) may be symmetrical around longitudinal axis 100*b*. In some implementations, longitudinal axis 100*b* may coincide with the center line through base body 11*b* from top to bottom. FIG. 6 shows an offset 13*x* between rotational axis 13*a* and longitudinal axis 100*b*. Set of blades 13 is offset towards the back of base assembly 11.

In some implementations, electrical motor 14 is offset towards the back of base assembly 11, e.g., by a similar offset distance as used for positioning set of blades 13. In some implementations, offset 13x may be between 5% and 15% of container diameter 20d (FIG. 11). In some implementations, offset 13x may be between 8% and 12% of container diameter 20d (FIG. 11). In some implementations, offset 13x may be between 5% and 15% of container diameter 20e (FIG. 11). In some implementations, offset 13x may be between 10% and 20% of container diameter 20e (FIG. 11). In some implementations, offset 13x may be between 5% and 15% of blade diameter 13d (FIG. 5). In some implementations, offset 13x may be between 10% and 14% of blade diameter 13d (FIG. 5). In some implementations, offset 13x may be between 15% and 20% of blade diameter 13d (FIG. 5). In some implementations, offset 13x may be between 20% and 40% of blade diameter 13d (FIG. 5). In some implementations, offset 13x may be between 5% and 40% of blade diameter 13d (FIG. 5). In some implementations, offset 13x may be between 5% and 15% of base diameter 11a (FIG. 5). In some implementations, offset 13x may be between 10% and 20% of base diameter 11a (FIG. 5). In some implementations, offset 13x may be between 20% and 40% of base diameter 11a (FIG. 5). In some implementations, offset 13x may be between 5% and 40% of base diameter 11a (FIG. 5).

Referring to FIG. 1, rechargeable battery 15 may be configured to power electrical motor 14. In some implementations, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable. In some implementations, rechargeable battery 15 may have a capacity between 1000 mAh and 6000 mAh. In one or more preferential implementations, rechargeable battery 15 may have a capacity of about 2500 mAh. In some implementations, control circuit 17 may be configured to control charging of rechargeable battery 15. For example, control circuit 17 may control the transfer of electrical power through standardized charging interface 25 into rechargeable battery 15. For example, responsive to a detection that rechargeable battery 15 is fully charged, control circuit 17 may prevent the transfer of electrical power through standardized charging interface 25 into rechargeable battery 15.

Standardized charging interface 25 may be configured to conduct electrical power to rechargeable battery 15. In some implementations, standardized charging interface 25 may be configured to conduct electrical power to charge rechargeable battery 15, e.g., from an external power source. In some implementations, standardized charging interface 25 may be configured to support wireless charging of rechargeable battery 15, e.g., from an external power source, including but not limited to induction-based charging. In some implementations, standardized charging interface 25 may be a universal serial bus (USB) port configured to receive an electrical connector for charging rechargeable battery 15. In such a case, the electrical connector may be connected to an external power source. In some implementations, standardized charging interface 25 may be covered for protection and/or other reasons.

Detector 18 may be configured to detect whether first mechanical coupling 16a of base assembly 11 is engaged with second mechanical coupling 16b of container assembly 12. In some implementations, detector 18 may be configured to detect whether base assembly 11 is coupled to container assembly 12 in a manner operable and suitable for blending by blender 100. In some implementations, operation of detector 18 may use one or more magnetic elements. For example, in some implementations, one or more magnetic elements are included in container body 20 at or near proximal end 21 of container assembly 12. Engagement may be detected responsive to these one or more magnetic elements being aligned and sufficiently close to one or more matching magnetic elements that may be included in base assembly 11 (e.g., at or near first mechanical coupling 16a of base assemble 11).

Power interface 29 may be part of the user interface of blender 100. Power interface 29 may be configured to be engaged manually by the user, for example by pushing power interface 29 to turn blender 100 on and off. In some implementations, control by a user of blender 100 may be based on a switch (not shown), a button, a touchscreen (not shown), voice-controlled operation (not shown), gesture-based operation (not shown), and/or other types of user interfaces suitable to turn consumer appliances on and off. Power interface 29 may be configured to illuminate in various colors (red, blue, etc.) and/or patterns (solid, fast blinking, slow blinking, alternating red and blue, etc.). Power interface 29 may convey information regarding the operational status of blender 100 to a user. The operation status of blender 100 may be determined by control circuitry 17. Power interface 29 may be controlled by control circuitry 17. For example, if power interface 29 is solid red, blender 100 may be charging and/or insufficiently charged to blend. For example, if power interface 29 is solid blue, blender 100 may be ready for blending. For example, if power interface 29 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper blending, and power interface 29 may warn the user when the treaded couplings are not tightened sufficiently. In some implementations, power interface 29 may include a power button configured to be manually engaged by the user.

Control circuitry 17 may be configured to control different functions and/or operations of blender 100, including but not limited to turning blender 100 on and off, charging of rechargeable battery 15, controlling of electrical motor 14 regarding and/or during rotation of set of blades 13, determining whether mechanical couplings 16 are engaged properly for blending, controlling operation of power interface 29, and/or performing other functions for blender 100. In some implementations, control circuitry 17 may be configured to prevent rotation of set of blades 13 responsive to a determination that mechanical couplings 16 are not engaged (or not engaged properly for the intended operation of blender 100). In some implementations, control circuitry 17 may be configured to control power interface 29 to convey information regarding the operational status of blender 100 to a user. For example, power interface 29 may include a light that can illuminate in various colors and/or patterns. In some implementations, control circuitry 17 may be implemented as a printed circuit board (PCB).

Figure 15A:
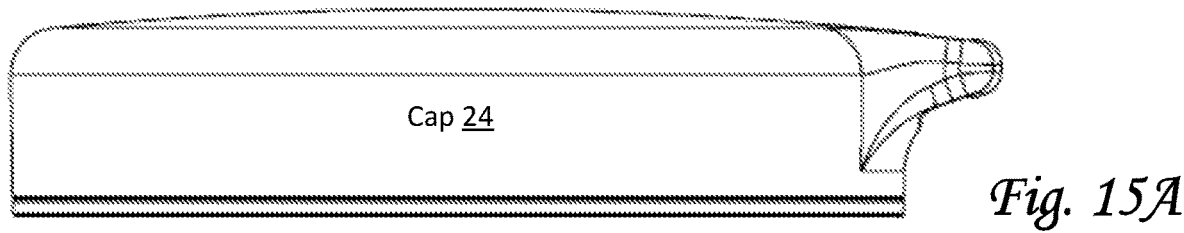
FIG. 15A shows a front view of a cap of a rechargeable blender with offset blades configured to blend foodstuffs, in accordance with one or more implementations.
Figure 15B:
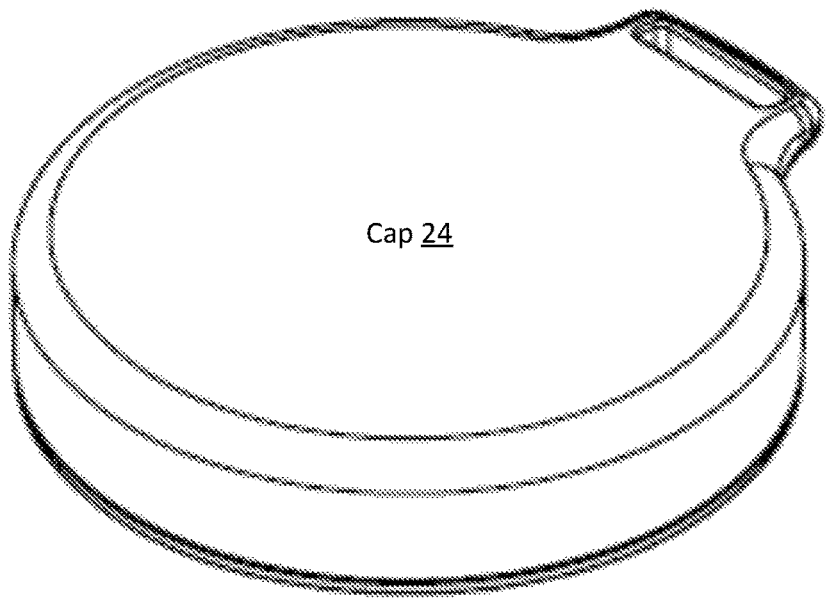
FIG. 15B shows an isometric elevated view of a cap of a rechargeable blender with offset blades configured to blend foodstuffs, in accordance with one or more implementations.
Figure 15C:
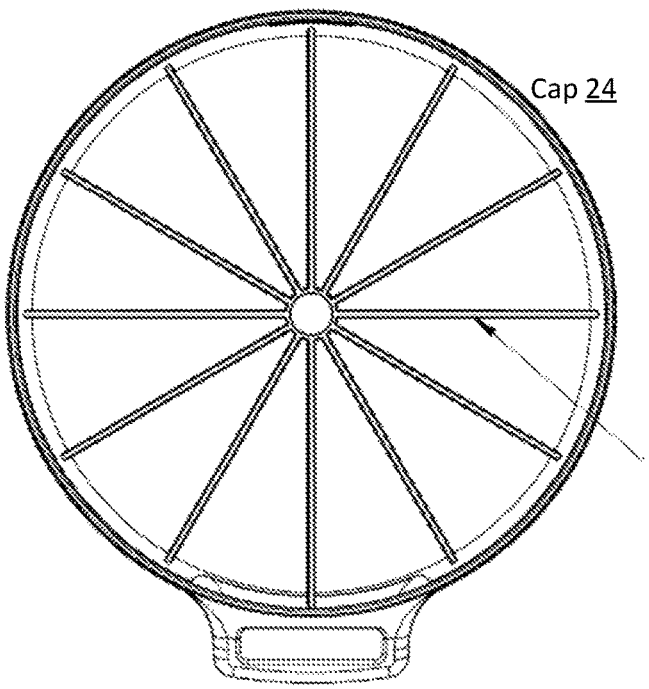
FIG. 15C shows a bottom view of a cap of a rechargeable blender with offset blades configured to blend foodstuffs, in accordance with one or more implementations.

Referring to FIG. 1, cap 24 may be disposed at or near distal end 22 of container assembly 12. In some implementations, cap 24 may be removable. For example, removing cap 24 may create an opening at distal end 22 of container assembly 12. In some implementations, blended foodstuffs may be removed through this opening, e.g., by pouring. By way of non-limiting example, FIG. 15A illustrates a front view of cap 24, FIG. 15B shows an isometric elevated view of cap 24, and FIG. 15C shows a bottom view of cap 24. In some implementations, cap 24 may include a threaded coupling 27b that is configured to engage with container body 20 (as shown in FIG. 1 and FIG. 4). In some implementations, the combination of cap 24 and filter 27 may include a threaded coupling that is configured to engage with container body 20. In some implementations, cap 24 may include a spout, indentation, and/or other shape of its structure that may be used to pour and/or drink from. For example, such an opening may be coverable during blending of blender 100.

Referring to FIG. 1, in some implementations, coupling 24a of container assembly 12 may be configured to removably couple cap 24 to container body 20 and/or other components of container assembly 12. In some implementations, coupling 24a may be a threaded coupling. In some implementations, coupling 24a may have a parallel thread.

Referring to FIG. 1, carrying strap 3 may be configured to carry blender 100. In some implementations, carrying strap 3 may be attached to cap 24 as depicted in FIG. 1. Alternatively, in some implementations, carrying strap 3 may be attached to container assembly 12, e.g., to container body 20.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A portable and rechargeable blender configured to blend foodstuffs, the blender comprising:
    a base assembly, a container assembly, and control circuitry, wherein the base assembly includes:
        an upper blade mount having a horizontal top surface;
        a set of blades supported by a shaft that is rotationally mounted below the upper blade mount, wherein the set of blades is configured to rotate around a rotational axis and blend the foodstuffs, wherein the horizontal top surface of the blade mount is orthogonal to the rotational axis, wherein the set of blades has a blade diameter during blending by the blender;
        an electrical motor configured to drive the rotation of the set of blades, wherein the electrical motor is integrated into the base assembly, wherein the electrical motor is arranged below the set of blades and in line with the rotational axis;
        a rechargeable battery configured to power the electrical motor;
        a standardized charging interface configured to conduct electrical power to the rechargeable battery; and
        a first mechanical coupling configured to couple the base assembly to the container assembly;
    wherein the base assembly includes a horizontal surface between the base assembly and the container assembly during blending;
    wherein the base assembly has a cylindrical shape, wherein the cylindrical shape has a base diameter around an outer periphery of the base assembly near the first mechanical coupling,
    wherein the container assembly is configured to hold the foodstuffs within a cylindrical container body during blending by the blender,
    wherein the container assembly includes:
        a proximal end that is open and that is disposed, subsequent to the base assembly being coupled to the container assembly, near the set of blades;
        a distal end opposite the proximal end;
        a second mechanical coupling disposed at or near the proximal end of the container assembly, wherein the second mechanical coupling is configured to engage the first mechanical coupling to couple the base assembly to the container assembly; and
        the cylindrical container body extending from the second mechanical coupling to the distal end, wherein the cylindrical container body has a container diameter immediately above the second mechanical coupling, wherein diameters of the container assembly are substantially constant between immediately above the second mechanical coupling and the distal end of the container assembly, wherein a length of the container diameter matches a length of the base diameter,
    wherein, subsequent to the base assembly being coupled to the container assembly by engagement between the first mechanical coupling and the second mechanical coupling, the portable and rechargeable blender has a cylindrical shape such that, between the outer periphery of the base assembly and immediately above the second mechanical coupling, a diameter of the cylindrical shape of the portable and rechargeable blender is substantially constant,
    wherein the blade diameter is at least 50% of the container diameter,
    wherein the cylindrical container body has a longitudinal axis between the proximal end and the distal end, wherein the longitudinal axis is parallel to the rotational axis, wherein the rotational axis is offset by an offset distance from the longitudinal axis, wherein the offset distance is between 5% and 15% of the container diameter; and
    wherein the control circuitry is configured to control the electrical motor during rotation of the set of blades.

2. The blender of claim 1, wherein the offset distance is between 10% and 20% of the blade diameter.

3. The blender of claim 1, wherein the set of blades is mounted permanently to the base assembly, wherein the electrical motor is integrated permanently into the base assembly, and wherein the rechargeable battery is integrated permanently into the base assembly such that the base assembly forms an integral whole.

4. The blender of claim 1, further comprising a power button configured to be engaged manually by a user to turn the blender on and off, wherein the power button is included in the base assembly.

5. The blender of claim 1, wherein the set of blades includes two distal blade ends that are arranged apart by a distance equal to the blade diameter, wherein the set of blades is arranged such that a plane of rotation defined by the two distal blade ends during blending is orthogonal to the rotational axis.

6. The blender of claim 1, wherein the base assembly has a front side, a back side, a left side, and a right side, wherein the rotational axis is offset by the offset distance from the longitudinal axis such that the rotational axis is closer to the back side of the base assembly than to the front side of the base assembly, and further such that the rotational axis is equidistant from the left side and the right side of the base assembly.

7. The blender of claim 1, further comprising a detector, wherein the detector is configured to make a detection whether the base assembly is coupled to the container assembly in a manner operable and suitable for blending by the blender, and wherein the control circuitry is further configured to allow or prevent rotation of the set of blades, based on the detection by the detector.

8. The blender of claim 7, wherein the cylindrical container body includes one or more magnetic elements disposed at or near the proximal end of the container assembly, and wherein detection by the detector is based on proximity of magnetic elements in the detector with the one or more magnetic elements included in the cylindrical container body.

9. The blender of claim 1, wherein the cylindrical container body has a circular cross section.

10. The blender of claim 1, where the rechargeable battery is not user-replaceable.

11. The blender of claim 1, wherein the standardized charging interface is a universal serial bus (USB) port configured to receive an electrical connector for charging the rechargeable battery.

12. The blender of claim 1, wherein the standardized charging interface is configured to support wireless charging of the rechargeable battery.

13. The blender of claim 1, wherein the first and second mechanical couplings are threaded couplings.

14. The blender of claim 1, wherein the container assembly has a volume between 8 and 48 ounces.

15. The blender of claim 1, wherein the base assembly has a cylindrical shape having a diameter between 2 and 4 inches.

16. The blender of claim 1, wherein the rechargeable battery has a capacity between 1000 mAh and 6000 mAh.

17. The blender of claim 1, wherein the electrical motor is configured to operate at a voltage between SV and 10V, and wherein the electrical motor is configured to spin the set of one or more blades at a speed between 20,000 and 35,000 rotations per minute.

18. The blender of claim 1, wherein the control circuitry is included in the base assembly.

* * * * *